United States Patent [19]
Erichsen et al.

[11] Patent Number: 5,600,668
[45] Date of Patent: Feb. 4, 1997

[54] SLAB LASER

[75] Inventors: Kai Erichsen, Malente; Hermann Hage, Hamburg; Wolfgang Knapp, Hamburg; Berthold Leifermann, Hamburg; Volker Scholz, Lübeck; Norbert Taufenbach, Basthorst, all of Germany

[73] Assignee: Siemens Aktiengesellschaft, Munich, Germany

[21] Appl. No.: 494,056

[22] Filed: Jun. 23, 1995

Related U.S. Application Data

[63] Continuation of PCT/EP93/03648, Dec. 23, 1992.

[30] Foreign Application Priority Data

Dec. 23, 1992 [DE] Germany ............ 92 17 640.24

[51] Int. Cl.[6] ........................................ H01S 3/097
[52] U.S. Cl. .................... 372/87; 372/34; 372/82
[58] Field of Search ........................... 372/34, 87, 92, 372/82, 64

[56] References Cited

U.S. PATENT DOCUMENTS

| | | | |
|---|---|---|---|
| 4,939,738 | 7/1990 | Opower | 372/93 |
| 5,430,753 | 7/1995 | Welsch et al. | 372/87 |
| 5,434,881 | 7/1995 | Welsch et al. | 372/87 |

FOREIGN PATENT DOCUMENTS

| | | |
|---|---|---|
| 0275023 | 7/1988 | European Pat. Off. . |
| 0305893 | 3/1989 | European Pat. Off. . |
| 0486152 | 5/1992 | European Pat. Off. . |
| 8633774 | 8/1988 | Germany . |
| 9115045 | 10/1991 | WIPO . |

OTHER PUBLICATIONS

Publication: IEEE Journal of Quantum Electronics, QE–20 (1984) March, No. 3, New York (Wang et al.) pp. 276–283, "Radio Frequency Pumped Mid–Infrared Waveguide Lasers".

*Primary Examiner*—Leon Scott, Jr.
*Attorney, Agent, or Firm*—Herbert L. Lerner; Laurence A. Greenberg

[57] ABSTRACT

A slab laser includes cooled, mutually parallel electrodes having a given thickness. The electrodes have flat surfaces facing each other and defining a discharge chamber therebetween for containing a gas to be pumped, and the electrodes have flat surfaces facing away from the discharge chamber. Each of the electrodes has a plurality of sections being spatially separated from one another over at least a portion of the given thickness of the respective electrode. The electrodes are supported in such a way that movements of the flat surfaces facing away from the discharge chamber being caused by thermal expansion are opposed by only a negligible mechanical resistance.

19 Claims, 3 Drawing Sheets

SLAB LASER

CROSS-REFERENCE TO RELATED APPLICATION

This application is a Continuation of International Application Ser. No. PCT/EP93/03648, filed Dec. 21, 1993.

BACKGROUND OF THE INVENTION

Field of the Invention:

The invention relates to a slab laser including cooled, mutually parallel electrodes having flat sides or surfaces facing each other and forming a discharge chamber between the sides or surfaces in which a gas to be pumped is located.

Slab or strip conductor lasers are known, for instance, from European Patent Application 0 275 023 A1, corresponding to U.S. Pat. No. 4,719,639 and European Patent Application 0 305 893 A2, corresponding to U.S. Pat. No. 4,939,738. In those lasers, a narrow discharge chamber for a gas, especially $CO_2$, which is excited by a high-frequency voltage applied to the electrodes, is formed between plate-like electrodes that are parallel to one another. Resonator mirrors are provided opposite end surfaces of the narrow discharge chamber formed by the electrodes to attain a laser effect.

In those known gas lasers, heat that occurs upon pumping and because of the laser action is dissipated by heat conduction through the plate-like electrodes, so that a more-complicated gas circulation system is no longer necessary. That is possible because the electrodes are relatively large in surface area, and their mutual spacing, which is typically a few millimeters, is relatively slight, so that the gas volume enclosed between the electrodes is likewise relatively slight in proportion to the cooling area.

The laser output power obtainable with slab lasers depends on the surface area of the electrodes. Approximately 1.5W to 2.0W of power can be generated per square centimeter of electrode surface area. In order to be able to produce high output power, large-area electrodes are needed, which nevertheless cannot be kept adequately parallel to one another because of their non-uniform heating. Since inner flat surfaces, that is those facing toward the gas or discharge chamber, are heated, while the outer flat surfaces are cooled, a high temperature gradient required for heat dissipation occurs, so that the flat surfaces of an electrode which face each other experience different thermal expansion. That causes bending moments, which in turn cause the electrodes to be spaced farther apart at their ends than in the middle. The resulting distortion of the resonator worsens the laser performance, or in other words its mode stability and mode purity. Since the sagging increases as the electrode length increases, the known lasers cannot attain output power of more than a few hundred watts, because the enlargement of the electrode surfaces is only limitedly possible due to thermal bending.

SUMMARY OF THE INVENTION

It is accordingly an object of the invention to provide a slab laser, which overcomes the hereinafore-mentioned disadvantages of the heretofore-known devices of this general type and with which a higher output power can be attained without major effort or expense structurally.

With the foregoing and other objects in view there is provided, in accordance with the invention, a slab laser, comprising cooled, mutually parallel electrodes having a given thickness, the electrodes having flat surfaces facing each other and defining a discharge chamber therebetween for containing a gas to be pumped, and the electrodes having flat surfaces facing away from the discharge chamber; each of the electrodes having a plurality of sections being spatially separated from one another over at least a portion of the given thickness of the respective electrode; and the electrodes being supported in such a way that movements of the flat surfaces facing away from the discharge chamber being caused by thermal expansion are opposed by only a negligible mechanical resistance.

As a result of this structure, the electrodes no longer sag in their entirety from the effects of the temperature gradient between their hot inner surface and their cold outer surface. Instead, the sections sag individually, so that the curvature of the entire electrode is subdivided into individual curvatures of the sections, which in turn are so small that they no longer, or only insignificantly, affect the operating performance of the laser. It is possible to make this division into harmless individual curvatures because the electrodes are supported in such a way that thermal expansion motions of their flat surfaces facing away from the discharge chamber are possible without hindrance.

In accordance with another feature of the invention, the sections are separated from one another by groove-like notches in one flat surface of the electrodes. Transition surfaces in the region of these groove-like notches at which the individual sections are connected, thus act as hinges, which make it possible to break down the curvature of the entire plate into individual curvatures of the sections. Experiments have shown that the sagging of an electrode which is divided into three sections in this way is then only about 10% of the sagging of an undivided electrode of the same size.

In accordance with a further feature of the invention, the groove-like notches are provided in the flat surfaces of the electrodes which face away from the discharge chamber, and in particular extend crosswise to the longitudinal direction of the electrodes.

In accordance with an added feature of the invention, the groove-like notches are provided in the flat surfaces of the electrodes facing toward the discharge chamber.

In accordance with an additional feature of the invention, the depth of the groove-like notches is greater than $4/5$ and in particular greater than $9/10$ of the entire thickness of the electrode.

In accordance with yet another feature of the invention, in order to facilitate the hinge action, the groove-like notches are provided with a rounded groove bottom.

In accordance with yet a further feature of the invention, the electrodes have at least two layers, of which one layer is formed by a plurality of spatially separate individual segments disposed side by side on the other layer.

In accordance with yet an added feature of the invention, the individual segments are located on the surface of the electrodes facing toward the discharge chamber, and a plate that shields these sections cohesively toward the discharge chamber is provided.

In accordance with yet an additional feature of the invention, there are provided spacers between the electrodes. As a result, the spacing of the electrode plates and thus the resonator condition are adhered to as accurately as possible. In this case, only one electrode needs to be supported slidably, since then the other electrode is fixed through the spacers to the lower electrode, and therefore it is no longer additionally necessary to fix it in a laser housing, and thus there is again no hindrance to its thermal motions that occur on the back side.

In accordance with again another feature of the invention, a high cooling output of the individual sections is attained by providing coolant conduits for each section.

In accordance with a concomitant feature of the invention, the sections are joined together by elastic connecting elements carrying the coolant.

Other features which are considered as characteristic for the invention are set forth in the appended claims.

Although the invention is illustrated and described herein as embodied in a slab laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
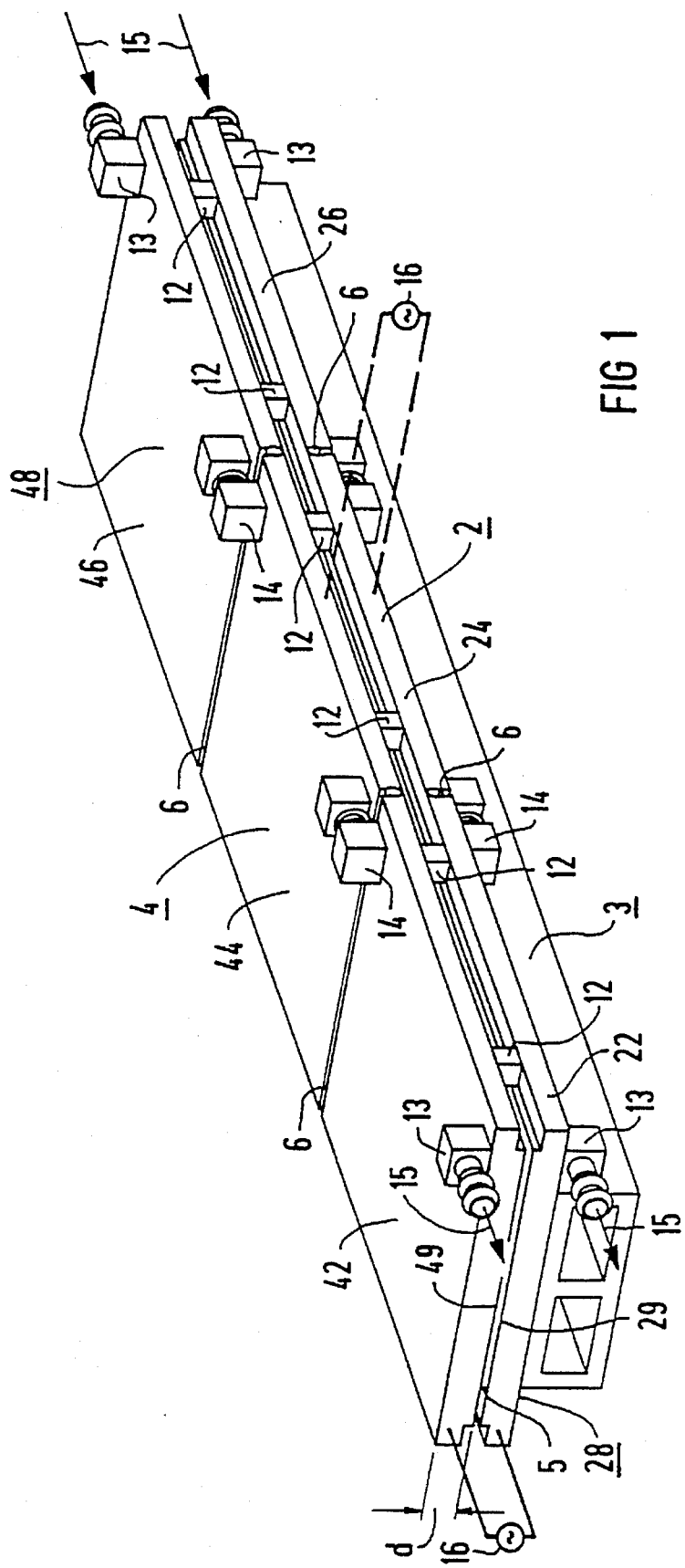
FIG. 1 is a diagrammatic, perspective view of a preferred embodiment of a slab laser according to the invention.

Referring now to the figures of the drawing in detail and first, particularly, to FIG. 1 thereof, there is seen a slab laser which contains two electrodes 2 and 4 extending longitudinally and having flat surfaces 29 and 49 facing each other and forming a relatively narrow discharge chamber 5 between them containing a gas to be pumped, especially $CO_2$.

The preferably metal electrodes 2 and 4, being preferably formed of copper (Cu), form walls of a waveguide that extends longitudinally in the electrodes 2 and 4, or in other words from the left front to the right rear. This waveguide, together with non-illustrated resonator mirrors that are disposed in such a way as to face end surfaces of the electrodes, forms a resonator path.

In order to excite the gas located inside the discharge chamber 5, the electrodes 2 and 4 are connected to a high-frequency generator 16. This connection can be made either at the end surfaces of the electrodes 2 and 4 or, as is shown in dashed lines, at the long edges of the electrodes 2 and 4.

The electrodes 2 and 4 are subdivided into sections 22, 24 and 26 on one hand, and 42, 44 and 46 on the other hand, by groove-like notches 6 extending crosswise to the longitudinal direction. Through the use of these groove-like notches 6, the sections 22, 24, 26 and 42, 44 and 46 are spatially separated from one another over at least a portion of a thickness d of these electrodes 2 and 4. The groove-like notches 6 are respectively located in outer flat surfaces 28 and 48 of the electrodes 2 and 4 and occupy the majority of the thickness d of the electrodes 2 and 4. The remaining thickness between the groove bottom and the flat surfaces 29 and 49 facing toward the discharge chamber 5 preferably amount to less than d/5, and in particular less than d/10.

The groove-like notches 6 have a rounded groove bottom, in order to reduce strains involved in independent sagging of the individual sections 22, 24, 26, 42, 44 and 46, and thereby minimize possible malfunctions at the surfaces 29 and 49 of the respective electrodes 2 and 4 facing toward the discharge chamber 5.

The outer sections 22, 26 and 42, 46 of the respective electrodes 2 and 4 contain connections 13 for a cooling medium, which is introduced in the direction of arrows 15 into cooling conduits that extend inside the electrodes 2 and 4 and are not visible in the drawing. The middle sections 24 and 44 are joined to their respective adjacent sections 22, 26 and 42, 46 by elastic connecting elements 14 that transfer the coolant. The connecting elements 14 are constructed in such a way that they can yield to mechanical deformations of the electrodes 2, 4 of the kind that occur with heating.

Instead of the cooling shown in the drawing which is in the form of a series connection of the sections 22, 24, 26 and 42, 44, 46, the various sections can also be connected separately to a coolant line that is brought from outside.

The electrode 2 is mounted slidingly or floatingly on a carrier 3 which is formed by a hollow profile section, and can move freely on this carrier 3 to an extent that is limited by non-illustrated stops, so that mechanical strains resulting within the electrodes 2 and 4 from uneven thermal expansion are reduced. The upper electrode 4 is supported through spacers 12 at a predetermined distance from the electrode 2. Instead of or in addition to the spacers 12, the upper electrode or plate 4 could also be likewise slidingly or floatingly held by a carrier corresponding to the carrier 3.

Instead of groove-like notches 6 extending crosswise, groove-like notches extending lengthwise may be provided. In that case, the sections can be analogously joined to one another by corresponding connecting elements for the coolant.

With a laser in accordance with FIG. 1, a substantially higher output power than with previously known lasers of the same type can be attained, since larger electrode surface areas are possible, with which a higher output power of the laser can be attained. Since a laser output power of approximately 1.5 to 2W per square centimeter is possible, a laser output power on the order of magnitude of 2 kW can be attained by electrodes that are approximately 1 m in length and 20 cm in width.

Figure 2:
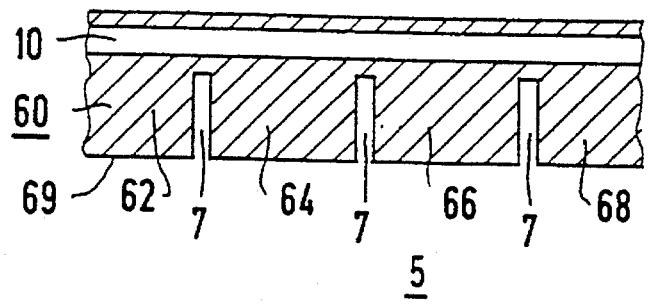
FIGS. 2, 3 and 4 are fragmentary, cross-sectional views of further advantageous geometrical features of electrodes according to the invention.

In accordance with FIG. 2, it is also possible to provide a metal electrode 60 having groove-like notches 7 formed in a flat surface 69 thereof facing toward the discharge chamber 5. The metal electrode 60 is subdivided by the notches 7 into a plurality of spatially separate sections 62, 64, 66 and 68. The drawing also shows a cooling conduit 10 extending within the region of the electrode 60, remote from the discharge chamber 5.

Figure 3:
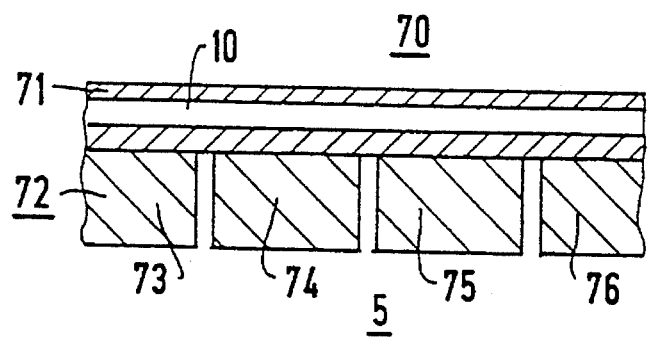

Instead of groove-like notches, FIG. 3 shows that it is also possible to provide a two-layered electrode 70, which has a first layer 71 being remote from the discharge chamber and containing the cooling conduits 10, and a plurality of spatially separate segments 73, 74, 75 and 76 which are disposed on the first layer 71 in a second layer 72. Both layers are formed of a metal material. Copper (Cu) is contemplated in particular for the second layer 72 which faces toward the discharge chamber 5.

Figure 4:
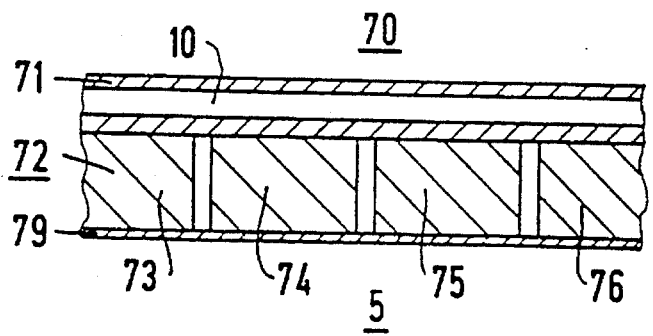

In order to be certain to impede the waveguide properties of the waveguide formed by a structure in accordance with FIG. 3 as little as possible, in the exemplary embodiment of FIG. 4 a thin plate 79, preferably made of copper, is additionally provided. Through the use of the thin plate 79, disturbances in the field course of the inciting HF field that might originate at the edges of the notches are prevented. The exemplary embodiment shown in FIG. 4 is analogously applicable to an electrode constructed in accordance with FIG. 2 as well.

Figure 5:
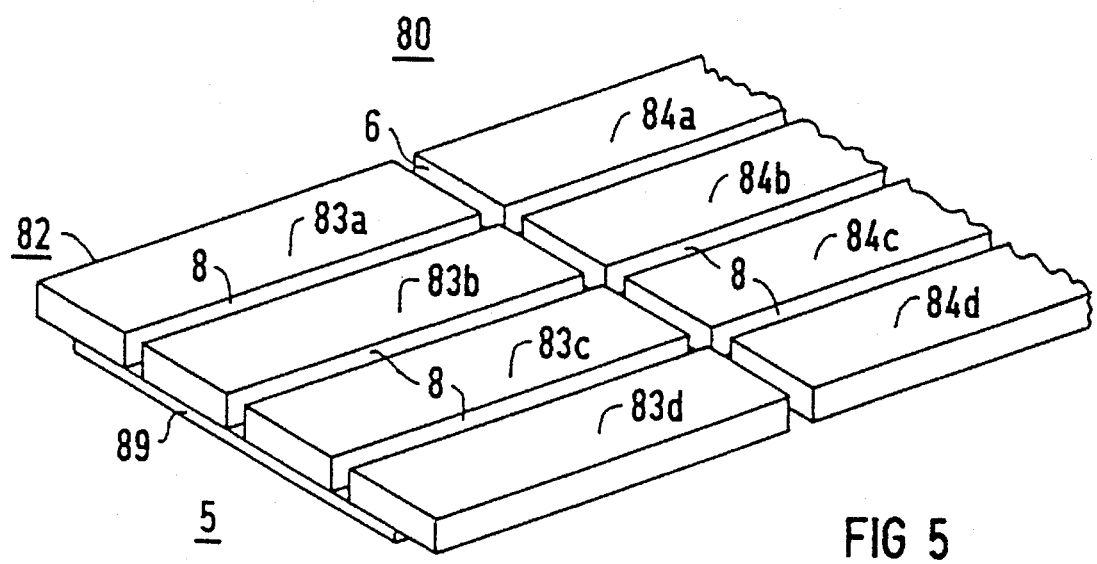
FIGS. 5 and 6 are fragmentary, perspective views of other suitable electrode embodiments.

FIG. 5 shows an embodiment of a metal electrode 80 that contains an upper layer 82 and a lower layer 89. The upper layer 82 includes a number of individual segments 83a–d and 84a–d, which are disposed on the lower layer 89 and are spatially separated from one another by crosswise grooves 6 and lengthwise grooves 8. The lower layer 89 is a thin, coherent plate. Instead of the two-layered structure shown in FIG. 5, a single-layered structure may also be provided, in which case the crosswise grooves 6 and the lengthwise grooves 8 are formed by corresponding notches, analogously to the exemplary embodiment of FIG. 1.

Figure 6:
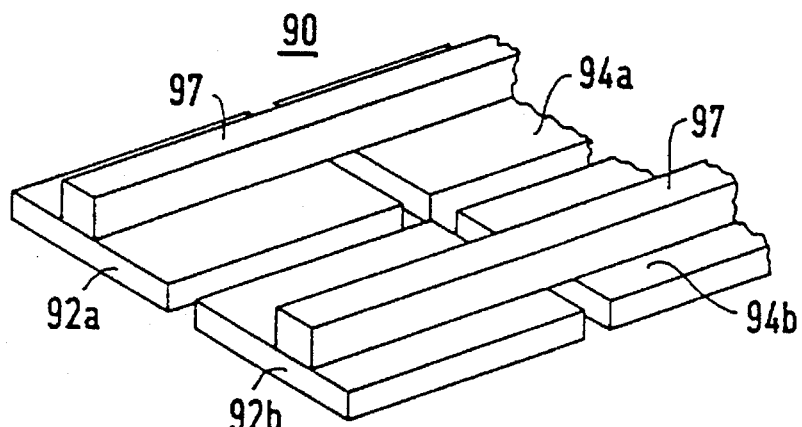

In the exemplary embodiment of FIG. 6, an electrode 90 is shown that is made up of a plurality of individual segments 92a, 92b, 94a and 94b, which are completely spatially separated from one another and are joined to one another floatingly or slidingly by retainers 97.

We claim:

1. In a slab laser, an electrode assembly, comprising:

a carrier;

mutually parallel electrodes supported on said carrier, said electrodes having a given thickness, said electrodes having flat surfaces facing each other and defining and bordering a discharge chamber therebetween for receiving a gas, and said electrodes having flat surfaces facing away from said discharge chamber;

each of said electrodes having a plurality of sections spatially separated from one another over at least a portion of said given thickness of said respective electrode; and said electrodes being supported on said carrier such that said flat surfaces facing away from said discharge chamber are freely movable.

2. The slab laser according to claim 1, wherein said sections are spatially separated from one another over a majority of said given thickness of said respective electrode.

3. The slab laser according to claim 1, wherein said sections are separated from one another by groove-like notches formed in one of said flat surfaces of said electrodes.

4. The slab laser according to claim 3, wherein said groove-like notches are formed in said flat surfaces of said electrodes facing away from said discharge chamber.

5. The slab laser according to claim 3, wherein said electrodes extend in a longitudinal direction, and said groove-like notches extend crosswise to said longitudinal direction.

6. The slab laser according to claim 3, wherein said flat surfaces of said electrodes facing toward said discharge chamber have said groove-like notches formed therein.

7. The slab laser according to claim 6, wherein said sections are individual segments, and including a plate being disposed on said flat surfaces of said electrodes facing toward said discharge chamber and covering said individual segments.

8. The slab laser according to claim 3, wherein said groove-like notches have a depth being greater than ⅘ of said given thickness of said electrodes.

9. The slab laser according to claim 3, wherein said groove-like notches have a depth being greater than 9/10 of said given thickness of said electrodes.

10. The slab laser according to claim 3, wherein said groove-like notches have a rounded groove bottom.

11. The slab laser according to claim 1, wherein said electrodes each have a first layer and a second layer, and one of said layers is formed of a plurality of spatially separate individual segments disposed side by side on the other of said layers.

12. The slab laser according to claim 10, wherein said second layer is a plate being disposed on said flat surfaces of said electrodes facing toward said discharge chamber and covering said individual segments.

13. The slab laser according to claim 1, wherein said sections of said electrodes are spatially separated individual segments, and said electrodes have retainers joining said segments together.

14. The slab laser according to claim 1, including spacers disposed between said electrodes.

15. The slab laser according to claim 14, including a carrier on which one of said electrodes is slidably supported.

16. The slab laser according to claim 1, wherein each of said sections has conduits for a coolant.

17. The slab laser according to claim 16, including elastic connecting elements joining said sections together and carrying the coolant.

18. The slab laser according to claim 1, wherein said electrodes have a longitudinal direction and end surfaces extending transversely to the longitudinal direction, and including a high-frequency generator connected to said end surfaces of said electrodes.

19. The slab laser according to claim 1, wherein said electrodes have long edges, and including a high-frequency generator connected to one of said long edges of said electrodes.

\* \* \* \* \*

UNITED STATES PATENT AND TRADEMARK OFFICE
CERTIFICATE OF CORRECTION

PATENT NO. : 5,600,668
DATED : February 4, 1997
INVENTOR(S) : Kai Erichsen et al.

It is certified that error appears in the above-indentified patent and that said Letters Patent is hereby corrected as shown below: On the title page:

Item (63) should read as follows:

Continuation of PCT/EP93/03648, December 21, 1993.

Signed and Sealed this

Twenty-fourth Day of June, 1997

Attest:

BRUCE LEHMAN

Attesting Officer

Commissioner of Patents and Trademarks

UNITED STATES PATENT AND TRADEMARK OFFICE
CERTIFICATE OF CORRECTION

| | |
|---|---|
| PATENT NO. | : 5,600,668 |
| APPLICATION NO. | : 08/494056 |
| DATED | : February 4, 1997 |
| INVENTOR(S) | : Kai Erichsen et al. |

It is certified that error appears in the above-identified patent and that said Letters Patent is hereby corrected as shown below:

On the title page the filing date of the corresponding PCT application should be listed as follows:

Item
[63]   Continuation of PCT/EP93/03648,   December 21, 1993

Signed and Sealed this

First Day of September, 2009

David J. Kappos
*Director of the United States Patent and Trademark Office*